3,475,497
PRODUCTION OF β-HALO ETHERS
Wilhelm Vogt, Cologne, and Hermann Richtzenhain, Cologne-Sulz, Germany, assignors to Dynamit Nobel Aktiengesellschaft, Bezirk, Cologne, Germany, a corporation of Germany
No Drawing. Filed Nov. 23, 1966, Ser. No. 596,434
Claims priority, application Germany, Nov. 25, 1965, D 48,745
Int. Cl. C07c 41/06, 41/04, 17/02
U.S. Cl. 260—611       12 Claims

ABSTRACT OF THE DISCLOSURE

Improvement in the production of β-halo ethers, which ethers are produced by the reaction of an olefin, a halogen and an alcohol, which improvement is occasioned by carrying out this reaction under substantially anhydrous conditions in the presence of either an alkali metal alcoholate or an aliphatic oxirane compound.

---

This invention relates to β-halo ethers. It more particularly refers to improvements in the process for preparing β-halo ethers and especially alkyl or substituted alkyl ethers.

β-halo ethers are known compounds. They are quite useful as solvents for various organic compounds and as reaction media in which organic synthesis is carried out.

In general, β-halo ethers are produced by the reaction of olefins with alcohols and halogens, with hypohalites or with N-halo amides.

Various preparative methods have been published on the manufacture of β-haloalkylethers from compounds having olefinic double bonds. For example, the chloralkoxylation can be performed by the direction addition of alkyl hypochlorites onto olefins (Chemical Reviews 54, (1954) 925–958). However, this method cannot be used industrially on account of the great explosiveness of free alkyl hypochlorites. Another possibility is offered by the reaction of olefins with inorganic hypochlorites in an alcoholic solution (J. Chem. Ind. (Russian Shurnal chimitscheskoi Proniyschlennosti) 12, 607–609 (1935)). This process, however, produces poor yields of β-chlorethers. Another possibility for the manufacture of β-chlorethers is the action of N-chlorocarboxylic acid amides or N-chlorosulfonic acid amides on olefins in the presence of alcohols (Z. obsc. Chim. 8, 370 (1938)). This method is too complicated for industry. The addition of $Cl_2$ onto olefins in the presence of alcohols has already been described. In addition to β-chlorethers, however, this reaction produces considerable amounts of 1,2-dichloro compounds by the direct addition of chlorine onto the double bond.

The known reaction of chlorine with compounds containing double bonds in alcoholic solutions, which results in the formation of β-chlorethers, and which is known as chloralkoxylation, is started by a chlorine cation attacking the olefinic double bond with the formation of an intermediate β-chlorocarbonium cation, which then reacts either with the alcohol present to form β-chlorether to complete the reaction, or with a chlorine anion to form the 1,2-dichloro compound to complete the reaction. In the formation of the β-chlorether, therefore, equimolar amounts of hydrogen chloride form, which greatly promotes the formation of 1,2-dichloro compounds as the reaction progresses. The amount of the 1,2-dichloro compound that occurs as a byproduct depends upon the ratio of the alcoholic reaction components to the amount of chlorine anions produced in the reaction. If the reaction is performed in a very great excess of alcoholic reaction components, β-chlorether is predominantly formed. As the excess of alcoholic reaction components is reduced, the formation of 1,2-dichloro compound increases greatly.

The use of marble or limestone, or of caustic soda solution and ammonia has been produced for the removal of the hydrogen chloride produced in this reaction. In no case, however, have yields been attained of more than 75% β-chlorethers plus 25% dichloro compounds.

It is therefore an object of this invention to provide an improved process for the production of β-halo ethers.

It is another object of this invention to provide an improved process for the production of β-chloroethers.

Other and additional objects of this invention will become apparent from a consideration of this entire specification including the claims appended hereto.

In accord with and fulfilling these objects, one aspect of this invention resides in the discovery that the yield of β-haloethers can be considerably improved by operating anhydrously and additionally by intercepting the hydrogen halide, which is produced in the reaction of halogen with compounds having olefinic double bonds in alcoholic solution, by means of particular acid-binding reagents, which take up the hydrogen halide formed as a reaction by-product without the formation of water.

If the reaction is performed in the presence of the acid-binding reagents of this invention which continually remove the hydrogen halide developing in the reaction, the quantity of the 1,2-dihalo compounds produced as a by-product assumes a substantially constant value and thus becomes independent of the ratio of the alcoholic reaction components to the chlorine anions developing in the reaction. Thus the reaction of chlorine and ethylene in a methanolic solution at a molar ratio of 1:1:50 results in a yield of 88% β-methoxyethylchloride and 12% 1,2-dichlorethane. The reaction products occur as a very dilute solution in methanol. Their concentration amounts to only 6% in methanol. The technical recovery of β-methoxyethylchloride from this dilute solution proves extremely difficult and entails considerable cost.The reaction of chlorine and ethylene in a methanolic solution in the molar ratio of 1:1:4, however, delivers only 58.7% of β-methoxyethylchloride plus 41.3% of 1,2-dichlorethane. The reaction products occur, it is true, as a 50% solution in methanol, but in this case the very great production of 1,2-dichloroethane as a by-product is highly disadvantageous.

By operating in the presence of the particular acid binding substances of this invention, namely alkali metal alcoholates or aliphatic oxirane containing compounds, the disadvantages of the prior art are substantially avoided and it becomes practical to produce β-halo ethers in excellent yields, with very low dihalo substituted by-products and to obtain the products in a respectable concentration in the reaction product.

Compounds suitable for the performance of the process are compounds having olefinic double bonds, of the general formula:

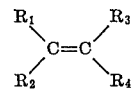

wherein the $R_1$ and $R_3$ may be identical or different moieties and include alkyl, alkenyl, alkoxyalkyl or aralkyl radicals as well as hydrogen. $R_2$ and $R_4$ may be identical or different moieties and include alkyl, alkoxalkyl, aryl or aralkyl radical as well as hydrogen. Further, $R_2$ and $R_4$ may together form a ring bridge so that they together with the olefinic bond depicted are a cycloalkene or cycloalkapolyene. Suitably such a ring has about 4 to 14 carbon atoms and desirably contains about 1 or 2 double bonds. Examples of compounds of the above general formula are the mono- and polyunsaturated aliphatic and cycloaliphatic hydrocarbons, e.g., ethylene, propylene, butenes (such as butene-1, butene-2 and isobutylene), styrene, silbene, butadiene, methylbutadienes, dimethylbutadienes, cyclopentene, cyclohexene, cycloheptene, cyclooctene, cyclooctadiene, cyclododecatriene and others, as well as the alkylallyl ethers, such as methylallylether, ethylallylether, n-propylallylether, etc. The olefins preferably have about 2 to 2 carbon atoms therein.

Anhydrous alcohols of the general formula $R_5OH$, in which $R_5$ represents an alkyl, aralkyl or cycloalkyl radical, which may be substituted if desired, can be used according to the invention. $R_5$ is exemplified by monohydric aliphatic, cycloaliphatic and aryl-substituted aliphatic (fatty aromatic) alcohols. Primary, secondary and tertiary alcohols can be used for the haloalkoxylation of the above olefins. Examples of univalent aliphatic alcohols within the scope of this invention are methanol, ethanol, propanol, isopropanol, n-butanol, sec-butanol, tert.-butanol, 2-ethylhexanol, n-dodecylacohol, ethylene glycolmonomethylether, ethylene glycolmonoethylether, and the like. Suitable cycloaliphatic alcohols are cyclopentanol, cyclohexanol etc., and their substitution products. Suitable aryl-substituted aliphatic alcohols are benzylalcohol, phenylethylalcohol etc. Suitably the alcohol has about 1 to 14 carbon atoms.

Halogens useful in this invention are exemplified by chlorine, bromine and iodine with chlorine being the preferred halo substituent.

The alkali metal portion of the alcoholate according to this invention is exemplified by lithium, sodium, potassium, rubidium, cesium, etc. The alcohol portion thereof is exemplified by methanol, ethanol, propanol (iso and normal), all the isomers of butanol, octanol, dodecanol and in general all of the alcoholic reactant used herein.

When the process is performed with the addition of acid-binding reagents of the alkali-alcoholate type, the alkali alcoholates of potassium and sodium are especially well suited. The alkali alcoholates are used preferably in stoichiometric quantities, although they can be used in less than the stoichiometric ratio. The use of alkali alcoholates as acid-binding reagents is advantageous particularly because the resultant alkali halides are difficultly soluble in the reaction medium. The solubility of sodium chloride in methanol at 20° C. is, for example, less than 1.5 wt. percent. On account of this difficult solubility they can also be removed from the reaction medium in a sample manner.

The halogen and the reactant compound having the olefinic double bonds are preferably used in stoichiometric quantities. They are introduced individually or together into the anhydrous alcohol which is best used in a molar excess.

For practical reasons, the alcohol is used in ratios of 1:1 to 40:1, and preferably from 4:1 to 10:1, with respect to the compound with the olefinic double bond or bonds. In a reaction according to this invention with a molar ratio of 1:1:4, the hydrogen chloride formed in the reaction is continuously removed with sodium methylate and a methoxyethylchloride yield of 88% is achieved with a 12% 1,2-dichlorethane by-product yield. If potassium methylate is used to intercept the hydrogen chloride, the amount of 1,2-dichlorethane that occurs as a by-product is reduced to as little as 10%.

Things are much the same in the case of the reaction of chlorine and ethylene in an ethanolic solution. When the reaction is performed with a molar ratio of 1:1:4, the products are 51% β-ethoxyethylchloride plus 49% 1,2-dichlorethane. But if the hydrogen chloride developing in the reaction is continually removed from the reaction mixture by the addition of sodium ethylate, the yield of β-ethoxyethylchloride increases to 89% and the amount of 1,2-dichlorethane that is produced as a by-product is reduced to 11%.

It is true that the removal of the hydrogen chloride that occurs in the chloralkoxylation can also be performed by neutralization with marble or limestone, but the yield of methoxyethylchloride is not thereby improved, for the calcium chloride that is formed remains in solution so that the chlorine anions are not removed from the reaction medium and continue to have an adverse influence on the reaction. If the hydrogen chloride is neutralized with sodium hydroxide, the water that is produced has a very disadvantageous effect, since it increases the solubility of the sodium chloride in the reaction medium and hence increases the formation of the dichloro compound. Furthermore, in the presence of water, chlorohydrins can develop from the olefins instead of β-chlorethers, and β-β'-dichlorethers can develop as by-products.

When the process is performed with the addition of acid-binding reagents of the aliphatic oxirane containing type, both monoepoxides and polyepoxides can be used. Suitable monoepoxides are the epoxidized compounds of mono-unsaturated hydrocarbons (ethylene, propylene, butylenes, cyclohexene), halogen-containing epoxies (epichlorhydrin), and glycidyl ethers of univalent alcohols (methyl, ethyl, n- and i-propyl, n-, i- and tert. butyl, 2-ethylhexyl and dodecyl alcohol etc.).

Suitable polyepoxides are the following: epoxides of polyunsaturated hydrocarbons (vinyl cyclohexene, dicyclopentadiene, cyclohexadiene, cyclododecatriene, butadienes) and glycidyl ethers of multivalent alcohols (ethylene, propylene and butylene glycols, polyglycols, thiodiglycols, glycerin etc.)

The oxirane containing compounds suitably contain up to about 14 carbon atoms in that portion of the molecule which contains the oxirane group or groups. The aliphatic oxirane containing moieties are used preferably in stoichiometric amounts, i.e., 1 mole of monoepoxide per equivalent of halide, 0.5 mole of diepoxide per equivalent of halide, etc. They may, however, also be used in excess without affecting the yield. A slight excess (2–5%) above the stoichiometric ratio has proven advantageous.

For the performance of the process, it has proven to be especially advantageous to use the aliphatic epoxides in a physical state corresponding to that of the reacted alcohol. When working in the gaseous phase, those epoxides are preferred whose boiling point is lower than that of the reacted alcohol. When working in the liquid phase, gaseous and solid epoxy compounds can be used in addition to liquid, according to the invention.

The advantage of this process lies in the fact that the hydrogen halide developing in the reaction is continuously removed from the reaction medium with the formation of non-ionogenic, organic halogen compounds. The halohydrins that develop can be fed back into the process after their reconversion to epoxides by halo acid cleavage. The 1,2-dihalo compound occurring as a by-product of the reaction achieves a virtually constant value in the procedure of the invention, and thus becomes independent of the ratio of the alcoholic reaction components to the halogen anions developing in the reaction. In the case of a molar ratio of chlorine: ethylene: methanol of, for example, 1:1:5, if compounds are used for the interception of the hydrogen chloride, a methoxyethylchloride yield is achieved which ranges from 92 to 94%, while the quantity of the 1,2-dichlorethane produces as a by-product drops to 6 to 8%.

The end products resulting from the process of the invention can be described by the following general formula:

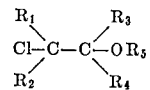

In this formula the R's have the meaning as previously stated.

The process of the invention is also suitable for continuous or batchwise operation. For the purpose of continuous operation, the starting compounds are introduced into a reaction vessel continuously in the required molar ratio, and the acid developing in the reaction is removed by the continuous addition of the acid-binding reagent. The withdrawal of the reaction product can then be performed either portion by portion or continuously. It has proven especially advantageous to perform the process in a circulatory apparatus with a high rate of liquid circulation. By this procedure, a high concentration of β-haloether is achieved with a relatively low turnover of halogen and olefin. It is advantageous to adjust the liquid circulation so that the quantity of reaction fluid in circulation amounts to 5 to 30 times the infeed of alcoholic reaction components.

The process of the present invention can be performed both at normal pressure and under reduced or elevated pressure.

The reaction is best performed at temperatures of —30 to +80° C., preferably at —10 to +40° C.

The following examples are illustrative of this invention without in any way being limiting thereon:

Examples 1 to 16

The following chloralkoxylations were performed at temperatures between —5 and 0° C., and at a rate of introduction of 0.58 mole of Cl$_2$ and olefin per hour in the stated amount of alkanol. The reaction in tert-butanol (Example 16) as the alcoholic component was performed at 30° C. The alkali alcoholates were used in a quantity up to 90 mole—% with reference to the chlorine. The yield of β-chlorether and 1,2-dichloro compound was determined by gas chromatography.

wherein said alcohol is present in a proportion of about 1:1 to 40:1 with respect to said olefinic reactant.

2. The improved process claimed in claim 1, wherein said olefin has up to about 20 carbon atoms according to the general formula

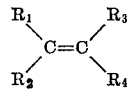

wherein said $R_1$ and $R_3$ are each selected from the group consisting of hydrogen, alkyl, alkenyl, alkoxy alkyl, aralkyl, $R_2$ and $R_4$ from the group consisting of hydrogen, alkyl, alkoxy alkyl, aryl, aralkyl and $R_2$ and $R_4$ together form an alkylene bridge.

3. The improved process claimed in claim 2, wherein said $R_1$ and $R_3$, respectively $R_2$ and $R_4$ are different.

4. The improved process claimed in claim 2, wherein said olefin is an alicyclic compound having about 4 to 14 carbon atoms in the ring.

5. The improved process claimed in claim 1, wherein said alcohol is at least one selected from the group consisting of methanol, ethanol, propanol, isopropanol, n-butanol, secbutanol, tert butanol, 2-ethylhexanol, n-dodecanol, ethylene glycol monomethyl ether, ethylene glycol monomethyl ether, cyclopentanol, cyclohexanol, benzyl alcohol and 2-phenylethanol.

6. The improved process claimed in claim 1, wherein said halogen is chlorine.

7. The improved process claimed in claim 1, wherein said alkali metal alcoholate has an alcoholic moiety se-

| | | | | Yields without acid-binding reagent | | | Yields with acid-binding reagent | |
|---|---|---|---|---|---|---|---|---|
| Example No. | Alcohol | Olefin | Molar ratios Cl$_2$:olefin: alcohol | β-chlorether (percent) | Dichloro-compound (percent) | Acid-binding Reagent | β-chlorether (percent) | Dichloro-compound (percent) |
| 1 | Methanol | Ethylene | 1:1:20 | 84 | 16 | NaOCH$_3$ | 87 | 13 |
| 2 | do | do | 1:1:10 | 79 | 21 | NaOCH$_3$ | 87 | 13 |
| 3 | do | do | 1:1:5 | 71 | 29 | NaOCH$_3$ | 88 | 12 |
| 4 | do | do | 1:1:4 | 60 | 40 | NaOCH$_3$ | 88 | 12 |
| 5 | do | do | 1:1:20 | 84 | 16 | KOCH$_3$ | 89 | 11 |
| 6 | do | do | 1:1:10 | 79 | 21 | KOCH$_3$ | 90 | 10 |
| 7 | do | do | 1:1:5 | 71 | 29 | KOCH$_3$ | 90 | 10 |
| 8 | do | do | 1:1:4 | 60 | 40 | KOCH$_3$ | 90 | 10 |
| 9 | do | Propylene | 1:1:20 | 81.7 | 18.3 | NaOCH$_3$ | 89 | 11 |
| 10 | do | Styrene | 1:1:20 | 76 | 14 | NaOCH$_3$ | 89 | 11 |
| 11 | do | Cyclohexene | 1:1:5 | 67.1 | 32.9 | NaOCH$_3$ | 87.5 | 12.5 |
| 12 | Ethanol | Ethylene | 1:1:21 | 77.8 | 22.2 | NaOC$_2$H$_5$ | 88 | 12 |
| 13 | do | do | 1:1:10 | 70 | 30 | NaOC$_2$H$_5$ | 89 | 11 |
| 14 | do | do | 1:1:6 | 63 | 37 | NaOC$_2$H$_5$ | 89 | 11 |
| 15 | do | do | 1:1:4 | 51 | 49 | NaOC$_2$H$_5$ | 89 | 11 |
| 16 | tert. Butanol | do | 1:1:5 | 60 | 40 | K-tert. butylate | 85 | 15 |

Examples 17 to 24

The following chloralkoxylations were performed at temperature between —5 and 0° C. and at rate of introduction of 0.58 mole of Cl$_2$ and olefin per hour in the stated amount of alkanol.

lected from the group consisting of methanol, ethanol, propanol, isopropanol, n-butanol, secbutanol, tert butanol, 2-ethylhexanol, n-dodecanol, ethylene glycol monomethyl ether, ethylene glycol monoethylether, cyclopentanol, cyclohexanol, benzyl alcohol and 2-phenylethanol.

8. The improved process claimed in claim 7, wherein

| | | | | Yields without acid-binding reagent | | | Yields with acid-binding reagent | |
|---|---|---|---|---|---|---|---|---|
| Example No. | Alcohol | Olefin | Molar ratios Cl$_2$:olefin: alcohol | β-chlorether (percent) | Dichloro-compound (percent) | Acid-binding Reagent | β-chlorether (percent) | Dichloro-compound (percent) |
| 17 | Methanol | Ethylene | 1:1:10 | 79 | 21 | Ethylene oxide | 93 | 7 |
| 18 | do | do | 1:1:40 | 88 | 12 | do | 94 | 6 |
| 19 | do | do | 1:1:20 | 84 | 16 | Propylene oxide | 92 | 8 |
| 20 | do | do | 1:1:40 | 88 | 12 | do | 92 | 8 |
| 21 | do | do | 1:1:20 | 84 | 16 | Epichlorhydrin | 92 | 8 |
| 22 | do | do | 1:1:40 | 88 | 12 | do | 92 | 8 |
| 23 | do | do | 1:1:10 | 79 | 21 | 2-ethylhexylglycidyl ether | 91 | 9 |
| 24 | Ethanol | do | 1:1:6 | 63 | 37 | do | 90 | 10 |

What is claimed is:

1. In the process of producing β-halo ethers by the reaction of an olefin, an alcohol of the formula $R_5$ OH, wherein $R_5$ is at least one member selected from the group consisting of alkyl, aralkyl and cycloalkyl, and a halogen; the improvement which comprises carrying out said reaction in the presence of an alkali metal alcoholate, wherein said reaction is carried out at about —30 to 80° C. and said alkali metal alcoholate and said alcoholic reactant have the same alcohol moiety.

9. The improved process claimed in claim 1, wherein said alcohol is present in a proportion of about 4:1 to 10:1 with respect to said olefinic reactant.

10. The improved process claimed in claim 1, wherein said acid binding material is present in a proportion of about stoichiometrically equivalent to about 5-percent excess with respect to acid halide by-product equivalency.

11. The improved process claimed in claim 1, wherein said halogen and said olefin are present in about equal mole proportions.

12. The improved process claimed in claim 1, carried out at about −10 to 40° C.

References Cited

UNITED STATES PATENTS

Re 22,217  11/1942  Perkins _____ 260—614

OTHER REFERENCES

Irwin et al.; Jour. Amer. Chem. Soc., vol. 63 (1941), pp. 858–860.

BERNARD HELFIN, Primary Examiner

U.S. Cl. X.R.

260—614, 615